US008627874B2

(12) United States Patent
Filip et al.

(10) Patent No.: US 8,627,874 B2
(45) Date of Patent: Jan. 14, 2014

(54) MOULD FOR METAL CASTING AND METHOD USING SAME

(75) Inventors: Petr Filip, Dlouha Loucka (CZ); David Hrabina, Prerov (CZ); Mairtin Burns, Paris (FR)

(73) Assignee: Foseco International Limited, Derbyshire (GB)

(*) Notice: Subject to any disclaimer, the term of this patent is extended or adjusted under 35 U.S.C. 154(b) by 0 days.

(21) Appl. No.: 13/480,698

(22) Filed: May 25, 2012

(65) Prior Publication Data

US 2012/0227922 A1    Sep. 13, 2012

Related U.S. Application Data

(62) Division of application No. 12/735,505, filed as application No. PCT/GB2009/002715 on Nov. 19, 2009, now Pat. No. 8,186,420.

(30) Foreign Application Priority Data

Apr. 1, 2009 (EP) ..................................... 09251029

(51) Int. Cl.
*B22C 9/08* (2006.01)
*B22D 43/00* (2006.01)
(52) U.S. Cl.
USPC .......................................... 164/134; 164/358
(58) Field of Classification Search
USPC .................................................. 164/134, 358
See application file for complete search history.

(56) References Cited

U.S. PATENT DOCUMENTS 3,598,732 A * 8/1971 Foster et al. ................... 210/499
4,681,624 A * 7/1987 DeAngelis et al. ............ 164/134

FOREIGN PATENT DOCUMENTS

| CH | 655 328 A5 | 4/1986 |
|---|---|---|
| DE | 42 29 417 A1 | 3/1993 |
| DE | 4229417 A1 * | 3/1993 |
| FR | 2 539 061 A | 7/1984 |
| JP | A 62-097744 | 5/1987 |
| JP | A 63-052744 | 3/1988 |
| JP | A 4-305356 | 10/1992 |
| JP | A 5-023835 | 2/1993 |
| JP | A 5-279718 | 10/1993 |
| JP | A 11-285782 | 10/1999 |
| RO | 106 209 B1 | 3/1993 |

(Continued)

OTHER PUBLICATIONS

Japanese Patent Application No. 2012-502760, Notification of Reason for Refusal, dated Jul. 23, 2013 (2 pgs).

(Continued)

*Primary Examiner* — Kevin P Kerns
*Assistant Examiner* — Kevin E Yoon
(74) *Attorney, Agent, or Firm* — Nixon & Vanderhye

(57) ABSTRACT

A mold for casting metal which allows solid impurities to be removed from the molten metal. The mold (50) has a cavity therein, said cavity having a casting portion and contiguous therewith a running system upstream of the casting portion, said running system comprising an upstream inlet portion (58), a downstream outlet portion (60) and a swirl chamber (54) disposed between the inlet and outlet portions (58, 60), wherein a filter (62) is provided at an interface between the swirl chamber (54) and the outlet portion (60). The application also relates to a method for preparing the mold, a pattern for preparing the mold, a housing for use in the mold and a method for casting employing the mold.

1 Claim, 16 Drawing Sheets

(56) References Cited

FOREIGN PATENT DOCUMENTS

| RO | 106209 | B1 | * | 3/1993 |
|----|--------|----|----|--------|
| RU | 2 213 641 | C2 | | 10/2003 |
| RU | 2213641 | C2 | * | 10/2003 |

OTHER PUBLICATIONS

Japanese Patent Application No. 2012-502760, English Translation of Notification of Reason for Refusal, dated Jul. 23, 2013 (3 pgs).

* cited by examiner

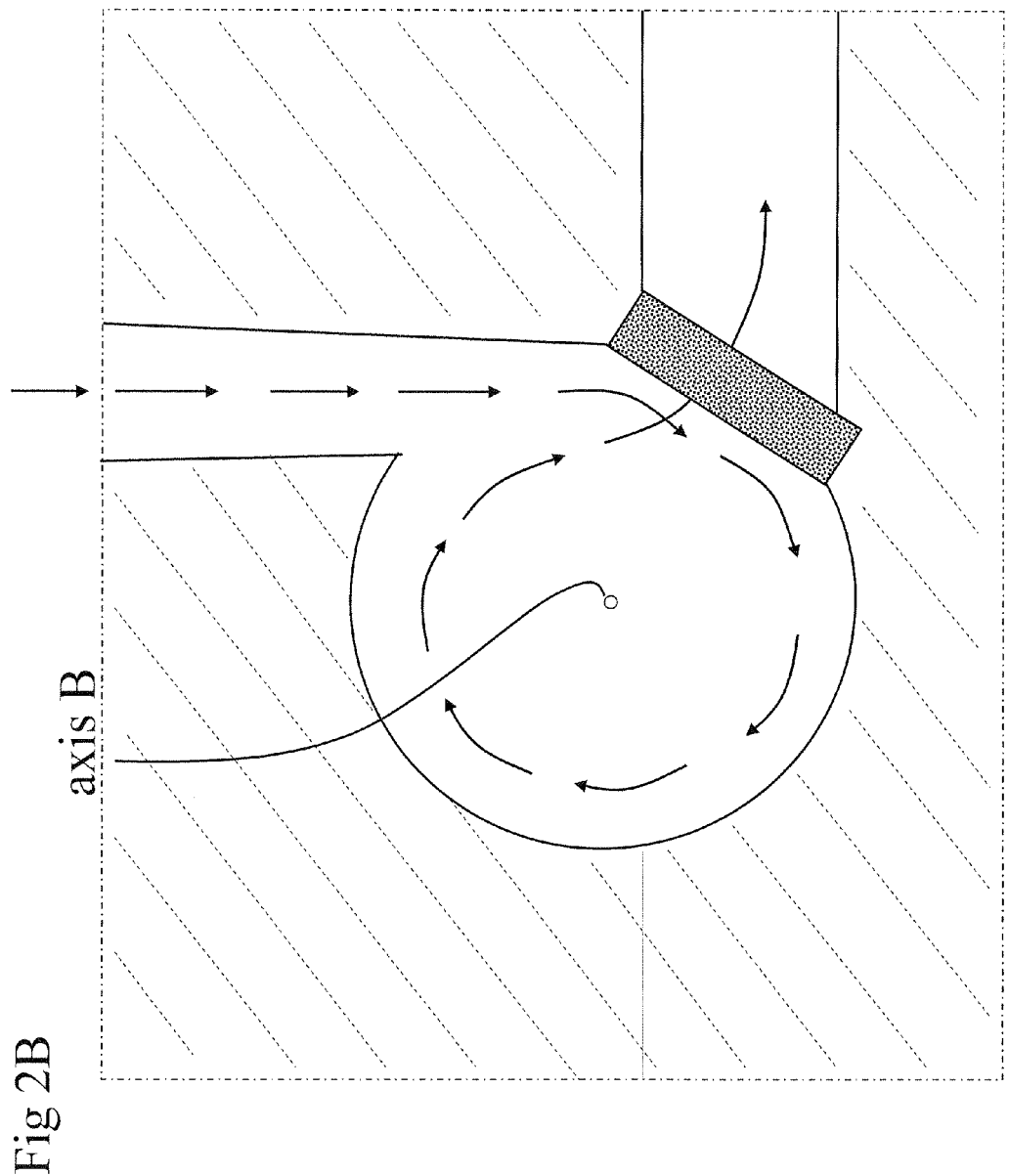

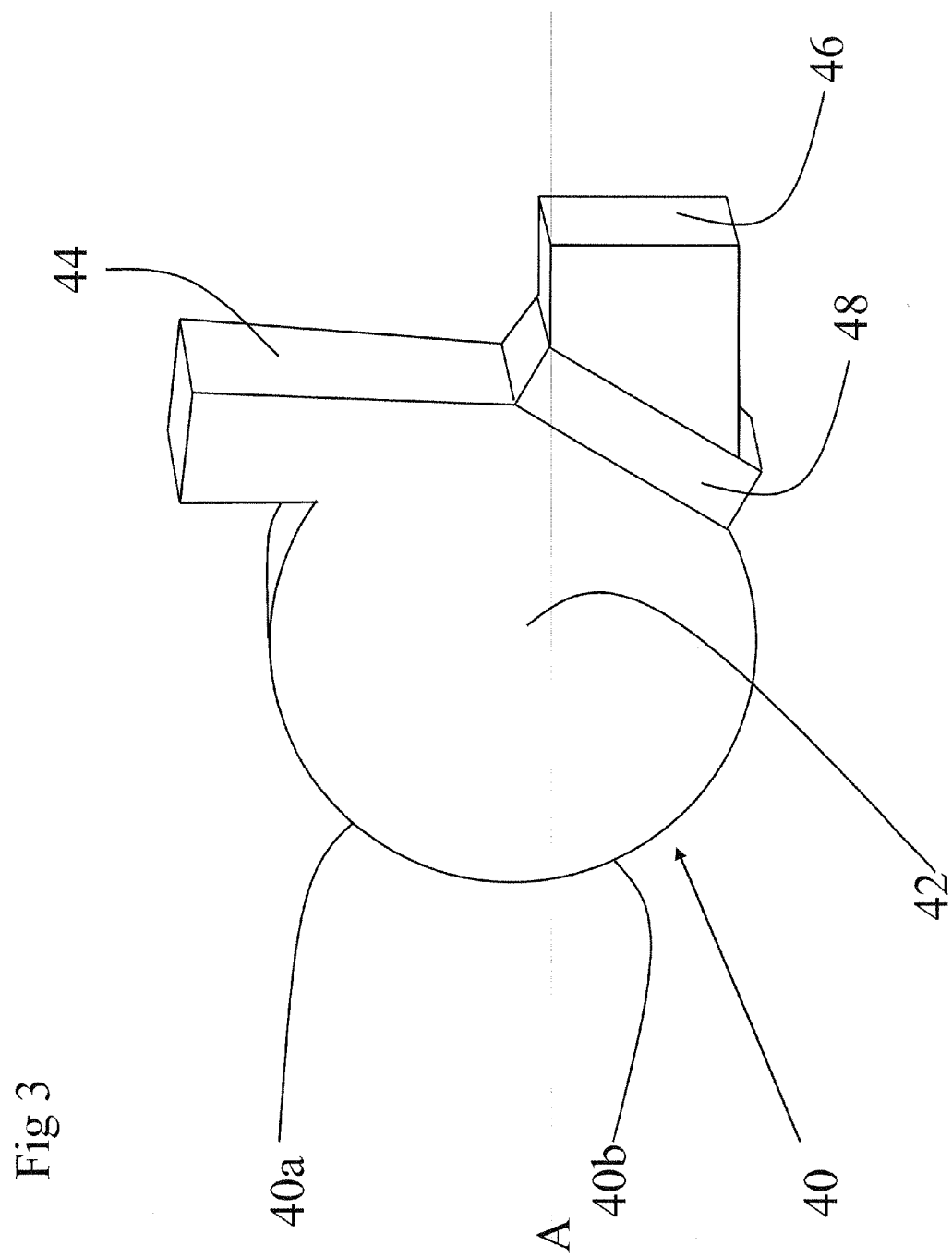

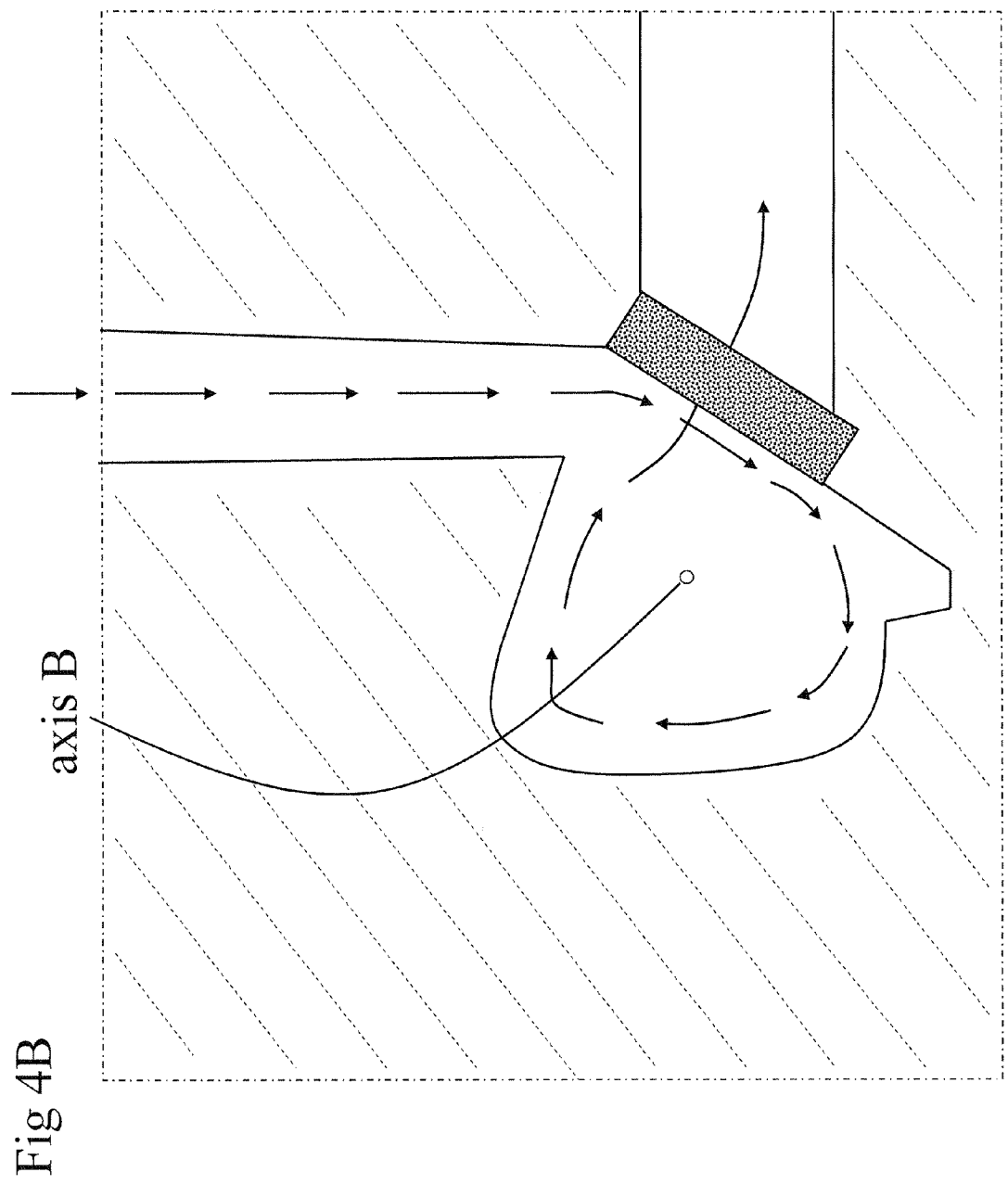

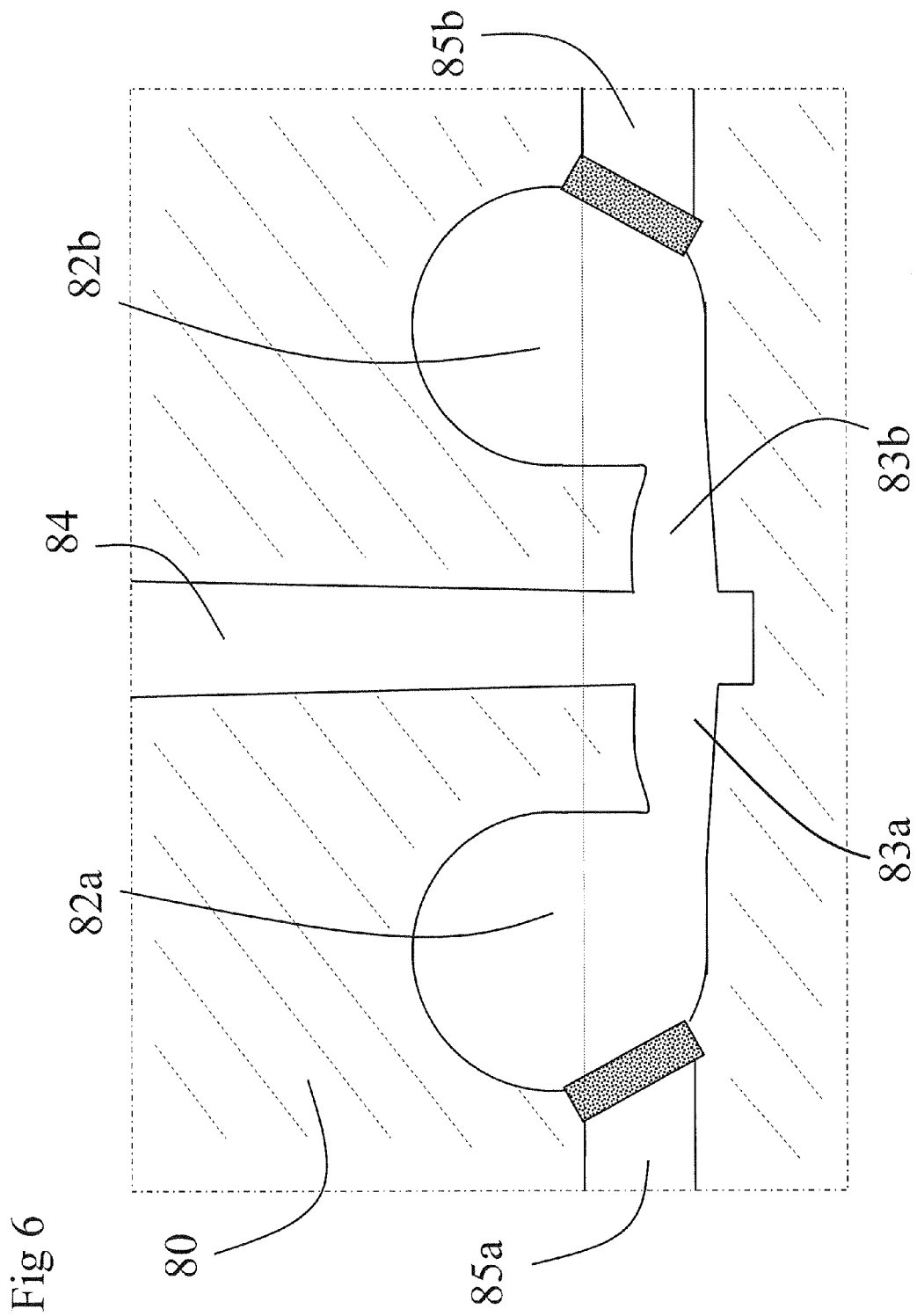

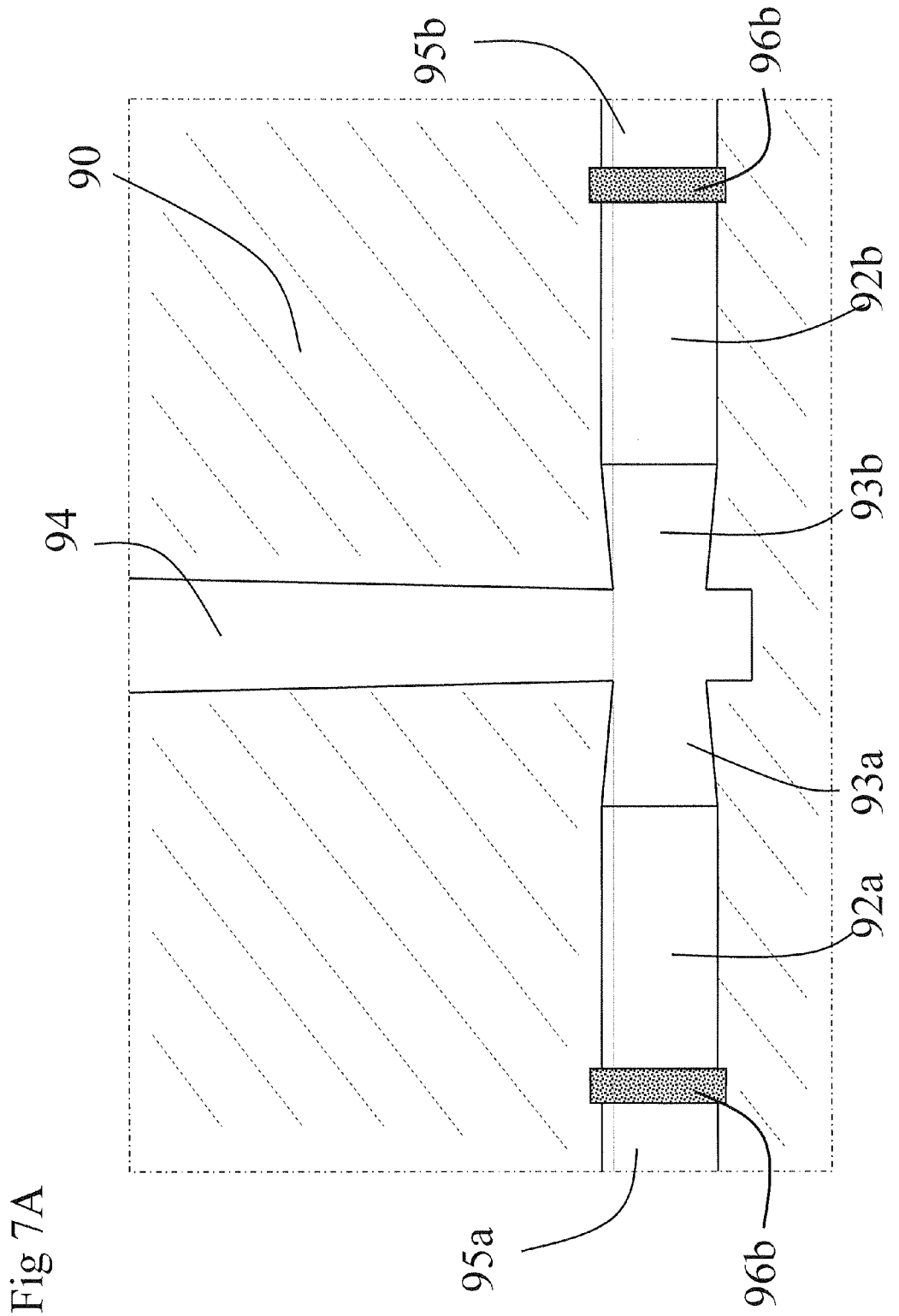

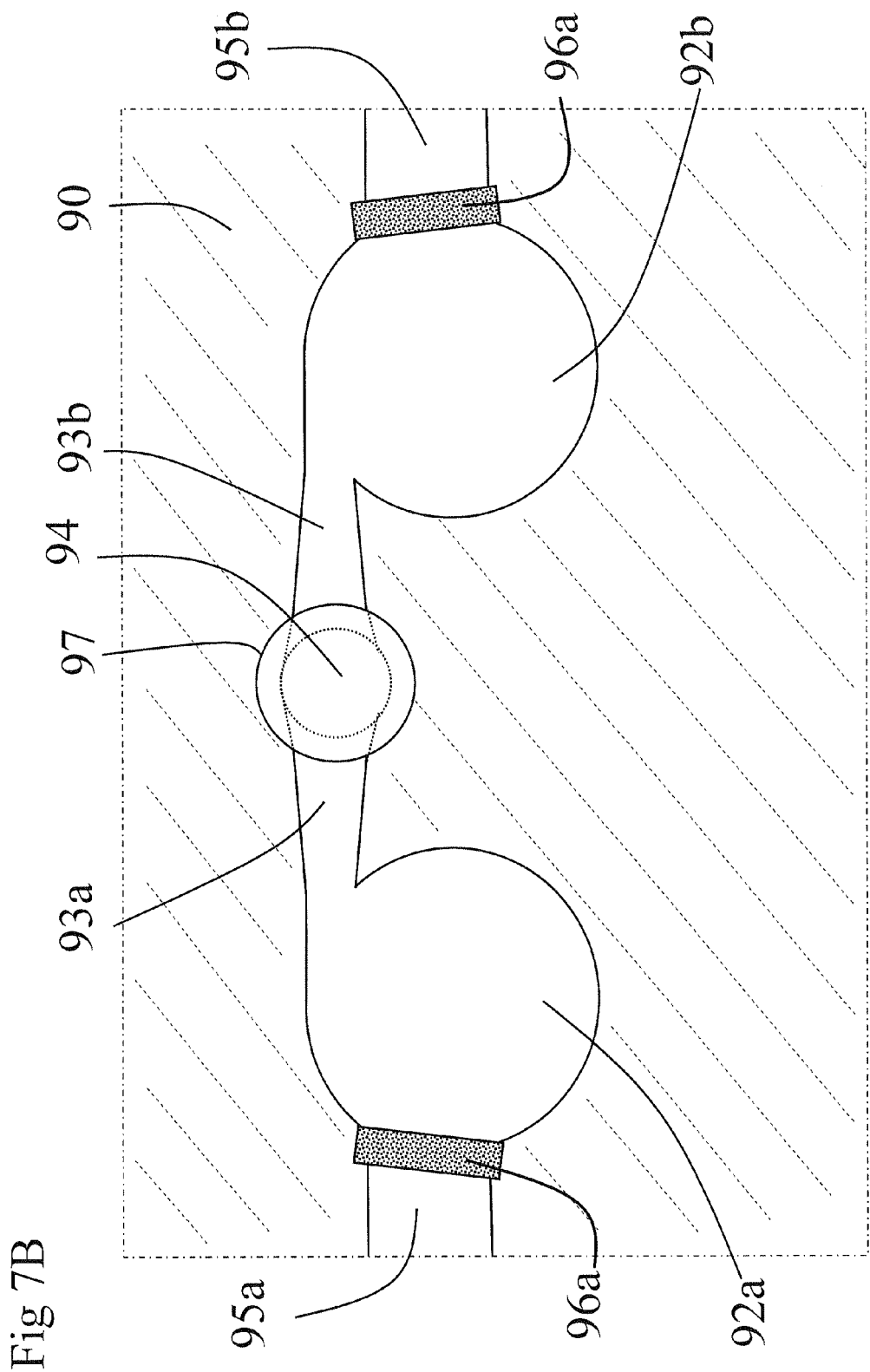

MOULD FOR METAL CASTING AND METHOD USING SAME

This application is a divisional of application Ser. No. 12/735,505 filed Jul. 22, 2010 now U.S. Pat. No. 8,186,420 which is a 371 of PCT/GB2009/002715 filed Nov. 19, 2009, which claims priority to European Application No. 09251029.6 filed Apr. 1, 2009, the entire contents of each of which are hereby incorporated by reference.

The present invention relates to a mould for casting metal and a method for metal casting employing such a mould.

The use of filters in metal casting is well known. A filter is primarily employed to prevent non-metallic inclusions in the molten metal from entering the casting. The presence of inclusions has a deleterious effect on the cast surface finish, mechanical properties and the machining characteristics and can lead to the scrapping of castings. Filters, in particular ceramic foam filters, also reduce the turbulence of the metal stream and allow for improvements in the running and gating systems, and subsequently the yield of castings.

For small castings, metal can usually be successfully fed to the casting using one metal stream and one filter. Difficulties can arise for larger castings since a conventional filter will not have the required capacity to feed a large casting i.e. it will become blocked, thus reducing or stopping the flow of metal and resulting in an incomplete casting. Hence it is necessary either to use a very large filter or to use multiple filtered metal streams leading into the casting. Problems can still arise due to the low filtration capacity resulting in filter blockages and long pouring times. Increasing metal pouring temperatures may partly overcome this problem, however this can lead to other problems which makes metal filtration technically and or economically unattractive. One solution to this problem is a filter carousel such as that described in DE 42 29 417 C 2. The filter carousel comprises a ceramic housing for a number of filters arranged in a ring. The molten metal flows through the filters from the outside of the ring to an outlet in the centre of the roof of the housing. The carousel allows a larger volume of metal to be filtered but is only useful for large castings, partly due to the high heat capacity of the ceramic housing and running systems.

A swirl chamber, also known as a swirl gate or centripetal trap, is a device to remove slag and other impurities from a melt (molten metal). The device uses the difference in density between the melt and the unwanted materials that are suspended or floating in the melt. The device causes the melt to spin thereby throwing the heavy metal outward and the lighter impurities inward where they coagulate and float upward.

RU2213641 describes a modified slag trap in a casting mould in the form of a cavity boss having an insert (which may comprise a filter) for a base and a metal receptacle below the insert. The insert has a ring shaped projection parallel to the walls of the cavity boss, such that when metal first enters the cavity boss, it flows around the gap between the cavity and the projection. The slag is said to float upward and be concentrated in the upper part of the cavity boss whereas melt flows downward through the insert into the metal receptacle, and then into the casting mould.

It is an object of one aspect of the present invention to provide a method for casting molten metal that reduces slag and other impurities in the casting by way of a swirl chamber.

According to a first aspect of the present invention, there is provided a mould for casting metal, said mould having a cavity therein, said cavity having a casting portion and contiguous therewith a running system upstream of the casting portion, said running system comprising an upstream inlet portion, a downstream outlet portion and a swirl chamber disposed between the inlet and outlet portions, wherein a filter is provided at an interface between the swirl chamber and the outlet portion,
and wherein the filter is arranged parallel to the axis about which metal rotates in use within the swirl chamber and a longitudinal axis of the inlet portion passes through the filter.

As used herein "upstream" and "downstream" relate to the general direction of metal flow into the mould during casting.

As used herein a swirl chamber is a chamber that imparts rotational motion to the molten metal passing through it (relative to the general motion of the metal through the running system).

In some embodiments, the swirl chamber has one or more curved surfaces that aid rotation of the metal in the swirl chamber. A peripheral surface of the swirl chamber may have a circular cross-section. The filter may be located in said peripheral surface.

The outlet portion will generally be horizontal within the mould whereas the orientation of the inlet portion is not particularly limited. In one convenient series of embodiments the inlet portion is substantially vertical, whereas in an alternative series of embodiments the inlet portion is substantially horizontal. Particularly in the case of a horizontal inlet portion, the skilled reader will appreciate that the running system will normally include a downsprue for receiving the molten metal upstream of the inlet portion.

In those embodiments where both the inlet and the outlet portions are horizontal, they may advantageously lie partially or completely in a common horizontal plane.

The longitudinal axis of the inlet portion passes through the filter. It will be understood that in those embodiments in which the inlet portion is orientated vertically, at least some of metal flowing into the swirl chamber will impact directly onto the filter.

In a certain embodiment, an angle defined between the longitudinal axis of the inlet portion and the plane of the upstream surface of the filter as viewed from the swirl chamber is >90° and <180°. The same angle may be >100° and/or <170°, or even >120° and/or <150°.

In a specific embodiment, the swirl chamber comprises a sump, the sump being the lowest region in the swirl chamber, and the filter is located between the inlet portion and the sump. The sump is useful for collecting metal leakage, for example, if metal drips into the swirl chamber prior to casting, such as leakage from a bottom pour ladle positioned over the mould prior to pouring of the metal into the mould. The leakage may collect in the sump rather than solidifying within the main part of the swirl chamber.

Any conventional filter suitable for filtering molten metal may be employed in the mould. In a particular embodiment, the filter is a foam filter or a cellular filter. Suitable foam filters include ceramic foam filters, such as silicon carbide-alumina filters such as those described in EP 0412673B1 and references therein, or zirconia filters such as those described by W H Sutton, J C Palmer, J R Morris: "Development of Ceramic Foam Material for Filtering High Temperature Alloys", AFS Transactions, p339 (1985), and carbon bonded filters such as those described in WO02/18075.

When placed in the mould, the filter will have an upstream surface facing the swirl chamber and a downstream surface facing the outlet. The edges of the filter may be held in the mould thereby decreasing the surface area of the filter available for filtering molten metal. The exposed area of the upstream surface of the filter is available to filter molten metal and is referred to as the "working" surface area of the filter.

The working surface area of the filter or each filter (as measured in $cm^2$) may be less than or equal to 15%, 12%, 9% or 6% of the volume of the swirl chamber (as measured in $cm^3$). The working surface area of the filter or each filter (in $cm^2$) may be more than or equal to 2% of the volume of the swirl chamber (in $cm^3$).

In another series of embodiments, the swirl chamber has a pair of mutually straight and parallel side walls, so that rotation of the metal is generally about an axis, which is orthogonal to the mutually parallel sidewalls. The distance between the sidewalls may be more than 60%, more than 70%, more than 80% or more than 90% of the width of the filter measured in a corresponding plane (i.e. a plane orthogonal to the sidewalls). Similarly the distance between the sidewalls may be less than 150%, less than 135%, less than 120%, or less than 110% of the width of the filter measured in a corresponding plane.

The swirl chamber may comprise more than one outlet portion together with an associated filter located at an interface between the swirl chamber and that outlet portion. In a certain embodiment, the filters are located such that a longitudinal axis of the inlet portion passes through just one filter. In a particular embodiment, the swirl chamber comprises 2 outlet portions and 2 filters, each filter being located at an interface between the swirl chamber and an outlet portion.

The mould may comprise a plurality of swirl chambers (and associated inlet and outlet portions), for example two or three swirl chambers. The mould may comprise a plurality of casting portions (and associated running systems), for example two or three castings portions (cavities). The mould may comprise one swirl chamber per casting portion (cavity). Alternatively one swirl chamber could be associated with more than one casting portion (cavity) or one casting portion (cavity) could be associated with more than one swirl chamber.

The invention also resides in a method for the preparation of the mould of the first aspect comprising providing a pattern having a peripheral surface that is complementary to the shape of the mould cavity,
surrounding the pattern with a suitable mould material,
setting said mould material, and
removing the pattern from the mould.

Although a single unitary pattern could be used to define the mould cavity, foundry practice would normally be to provide a plurality of components that fit together and collectively define the pattern.

The mould may be made in two parts (the upper and lower mould halves of a horizontally parted mould usually being referred to as the cope and drag respectively), in which case the pattern will also be constituted by at least two components (at least one component being associated with each mould half), the moulding material being applied to and set in each mould half separately and each pattern component being removed from the respective mould halves before the mould halves are brought together to form the mould. The pattern or the pattern components may be made from wood and metal and may be reusable.

The pattern may be made from a sacrificial material that volatilises on contact with molten metal, in which case removal of the pattern from the mould occurs during casting. Suitable sacrificial materials include expanded thermoplastics material such as polystyrene or a copolymer of styrene and methacrylic acid ester.

Of course, it is also possible to combine the above two technologies. For example, in a two part mould system some of the components defining the pattern may be made from a sacrificial material and others using removable and re-usable materials. For example, the casting portion could be defined by non-sacrificial pattern components and at least part of the running system, for example the swirl chamber, by sacrificial components.

The filter may be pre-formed in the pattern before preparation of the mould or it may be inserted during preparation of the mould. Typically, the filter will be pre-formed in the pattern if the pattern (or at least the region of the pattern around the filter) is manufactured from a sacrificial material. In the case of a two part mould system, the filter will normally be inserted into one of the mould halves immediately prior to the halves being brought together. A pattern of expanded thermoplastics material incorporating a filter is described in EP0294970.

Typically the mould material will be mould sand containing a binder. The mould sand is poured over the pattern, compacted and set by action of the binder. Moulding practices are well known and are described for examples in chapters 12 and 13 of Foseco Ferrous Foundryman's Handbook (ISBN 075064284 X). Moulding sand is typically silica sand, although other more expensive sands are used for special applications to impart specific properties to part or all of the mould and casting. Sand may be new, it may be recycled used sand, or it may be a combination of both. A typical process known as the no-bake or cold-setting process is to mix the sand with a liquid resin or silicate binder together with an appropriate catalyst, usually in a continuous mixer. The mixed sand is then compacted around the pattern by a combination of vibration and ramming and then allowed to stand, during which time the catalyst begins to react with the binder resulting in hardening of the sand mixture. When the mould has reached a handleable strength, it is removed from the pattern and continues to harden until the chemical reaction is complete. A refractory coating may then be applied to reduce the physical and chemical interaction between the sand mould and the metal casting and thus improve the surface of the finished casting. The coating may be applied by brush, spray or overpouring and allowed to dry before the filters and any feeding systems are placed in the moulds and the two halves assembled ready for casting.

Alternatively, the mould may be produced by clay bonded sand (usually referred to as greensand), which consists of a mixture of clay such as sodium or calcium bentonite, water and other additives such as coal dust and cereal binder. The sand mixture is placed around the pattern and compressed under pressure typically by application of a pneumatic or hydraulic force on a squeeze plate on top of the sand. Pressure is released and the mould is stripped from the pattern plate. The mould may then be used for casting, with or without the application of a refractory coating.

The invention also resides in the pattern component(s) for forming the swirl chamber and those parts of the inlet and outlet portions contiguous therewith of the mould of the first aspect, the peripheral surface of the pattern components being complementary to the shape of the swirl chamber, the filter and those parts of the inlet and outlet portions contiguous therewith.

According to a third aspect of the present invention there is provided a method for forming a metal casting comprising forming a mould having a cavity therein, said cavity having a casting portion and contiguous therewith a running system upstream of the casting portion, said running system comprising an upstream inlet portion, a downstream outlet portion and a swirl chamber disposed between the inlet and outlet portions, wherein a filter is provided at an interface between the swirl chamber and the outlet portion and the filter is arranged parallel to the axis about which metal rotates in use within the swirl chamber and a longitudinal axis of the inlet portion passes through the filter, pouring molten metal into the cavity such that it flows through the inlet portion and into the swirl chamber, inducing rotational motion in the molten metal in the swirl chamber, whereby to cause inclusions within the metal to accumulate in the swirl chamber, passing the molten metal through the filter into the outlet portion of the running system and then into the casting portion of the mould cavity, allowing the molten metal to solidify, and separating the casting from the mould.

For practical reasons, the method is particularly suited for castings greater than 25 kg, greater than 100 kg, greater than 250 kg or greater than 500 kg and less than 3000 kg or less than 1500 kg or less than 750 kg.

In some embodiments the metal used for the casting will be a ferrous metal, for example steel.

Once separated from the mould the casting may need finishing using various techniques well known in the art.

The invention also resides in a refractory housing for use in the mould of the first aspect, the housing comprising a swirl chamber disposed between an inlet portion and an outlet portion and being adapted to receive a filter, wherein the inlet and the outlet portions lie in the same plane and perpendicular to the axis about which metal rotates in use within the swirl chamber.

In one embodiment, the outlet portion is located in the peripheral surface of the swirl chamber.

In one embodiment, the housing additionally comprises a filter, wherein the filter is provided at an interface between the swirl chamber and the outlet portion and such that the filter is arranged parallel to an axis about which metal rotates in use within the swirl chamber and such that a longitudinal axis of the inlet portion passes through the filter.

The housing may be supplied in a kit together with a filter. In this way, the filter can be located in the housing in the foundry, prior to the preparation of the mould or prior to casting. Alternatively the housing may be supplied with the filter already located within the housing as described.

The housing is adapted such the filter is correctly located within the housing. The housing may have a recess, channels or slots for locating the filter within the housing. The filter may be located by means of a friction fit and/or lugs could be employed to secure the filter in place.

It will be understood that the casting method may utilise a mould having any of the features described in relation to the mould of the first aspect.

Embodiments of the invention will now be described by way of example only with reference to the accompanying drawings in which:—

FIG. 2B is a schematic diagram of metal flow through the running system shown in FIG. 2A during casting.

FIG. 3 is a perspective view of a pattern in accordance with an embodiment of the invention, corresponding to the part of the running system of FIG. 2A.

FIG. 4B is a schematic diagram of metal flow through the running system shown in FIG. 4A during casting.

FIG. 6 is a cross-section of part of a running system of a mould in accordance with another embodiment of the invention.

FIG. 7A is a cross-section of part of a running system of a mould in accordance with another embodiment of the invention.

FIG. 7B is a plan view of part of the running system of the mould shown in FIG. 7A FIGS. 8A and 8B are cross-sections of conventional filter prints employed in the comparative examples.

Figure 1:
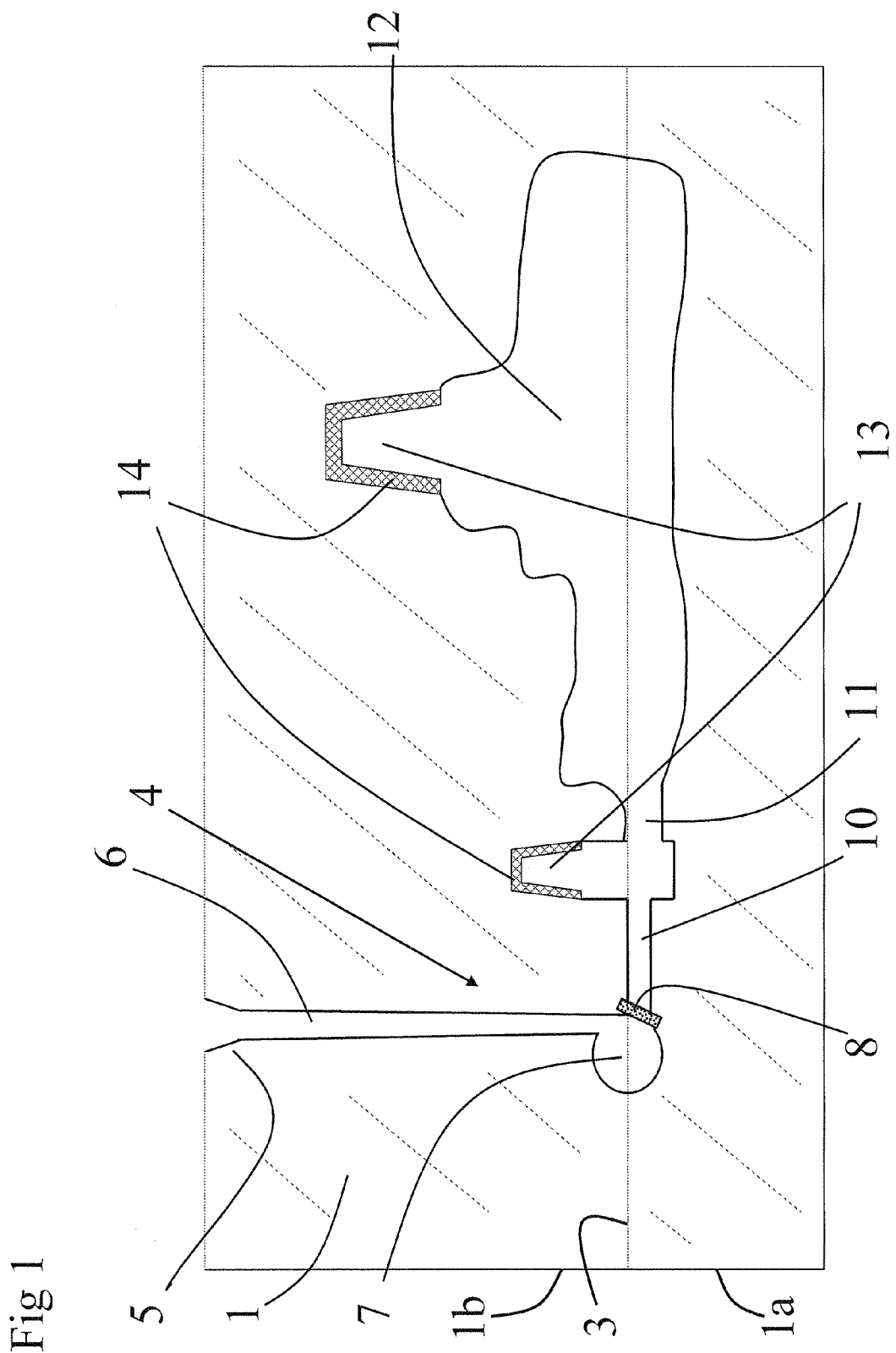
FIG. 1 shows a mould for casting metal in accordance with an embodiment of the invention

FIG. 1 shows a cross-section of a bonded sand mould 1 for casting metal. The mould 1 comprises a drag part 1a and a cope part 1b which meet along a parting line 3. A mould cavity comprises a casting cavity (portion) 12 and a running system 4. Molten metal flows through the running system 4 (upstream) to reach the casting cavity 12 (downstream). The running system 4 comprises a vertical downsprue 6 which has a funnel shaped pouring section 5 at its top end. The lower end of the downsprue 6 forms the inlet of a swirl chamber 7. The swirl chamber 7 has an outlet 10 which leads first to an ingate area 11 and then to the casting cavity 12. Hence, the swirl chamber 7 is contiguous with the casting cavity 12. A filter 8 is located at the interface between the swirl chamber 7 and the outlet 10, at the peripheral surface of the swirl chamber 7. Molten metal enters the cavity via the downsprue 6, flows around the swirl chamber 7, exits through the filter 8 to the outlet 10 and then continues to flow downstream via the ingate area 11 to the casting portion 12. The mould cavity shown in FIG. 1 contains optional components in the form of feeder heads 13, one placed near the ingate area 11 and another located on the casting cavity 12. The feeder heads 13 provide a reservoir of liquid metal during the filling of the casting cavity 12 and for a period during the subsequent solidification and shrinkage of the casting on cooling. The feeder heads 13 are surrounded by feeder sleeves (feeders) 14 which are low density insulating or exothermic refractory articles which extend the period of time that the enclosed metal remains liquid. The feeder sleeves 14 are placed in the mould 1 prior to assembly.

It will be appreciated that there are many variations in the design of the running system 4 dependent upon the size, shape and metal of the casting that is to be produced. For example, the downstream outlet portion 10 may lead directly into the casting cavity 12 rather than via an ingate area.

Figure 2A:
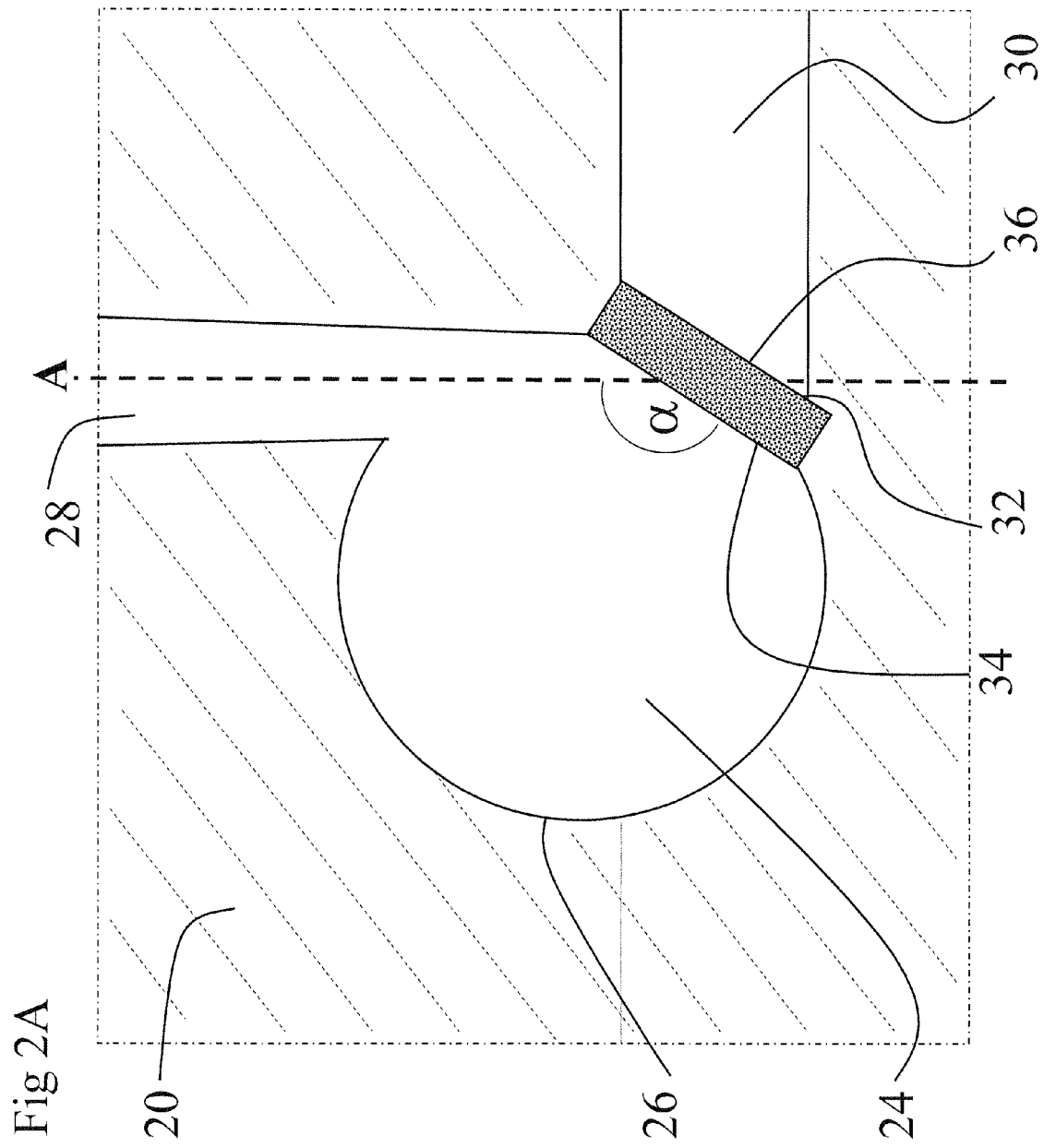
FIG. 2A is a cross-section of part of the running system of a mould in accordance with an embodiment of the invention.

FIG. 2A shows a cross-section of part of a sand mould 20 comprising part of a running system. The running system comprises a swirl chamber 24 which is approximately cylindrical, having a curved (circular cross-section as shown in FIG. 2A) peripheral surface 26 connecting two mutually parallel planar sidewalls (not visible in FIG. 2A). It will be understood that the sidewalls and surfaces of the running system are constituted by the inner surfaces of the mould 20. The swirl chamber 24 has an inlet 28 and an outlet 30, both of which extend from the peripheral surface 26 of the swirl chamber 24. The inlet 28 extends away from the swirl chamber 24 to the rest of the upstream part of the running system. The outlet 30 extends away from the swirl chamber 24 to the rest of the downstream part of the running system. The mould 20 is shown in the appropriate orientation for casting and as can be seen, the inlet 28 is substantially vertical and the outlet 30 substantially horizontal. A filter 32 is located in the peripheral surface of the swirl chamber 24, at the interface of the swirl chamber 24 and the outlet 30. The filter 32 has an upstream surface 34 facing the swirl chamber 24 and a downstream surface 36 facing the outlet 30. The inlet 28 has a longitudinal axis A, which passes through the upstream surface 34 of the filter 32. An angle α defined between the longitudinal axis A and the plane of the upstream surface 34 of the filter 32 is 150°. The swirl chamber has a diameter of 9.6 cm and a thickness of approximately 4.8 cm hence a volume of approximately 347.3 cm$^3$. The filter 32 has an exposed (working) surface area of approximately 23.04 cm$^2$ (4.8 cm×4.8 cm). Therefore the working surface area of the filter is 6.6% of the volume of the swirl chamber. The thickness of the swirl chamber 24 and the size of the filter 32 and the outlet 30 are designed such that the flow and velocity of the incoming metal is not significantly reduced during its residence in the swirl chamber 24.

In this embodiment, the inlet 28 and the planar sidewalls of the swirl chamber 24 are substantially vertical. In an alternative embodiment, the swirl chamber could be oriented so that the inlet 28 and the planar sidewalls would be substantially horizontal.

FIG. 2B demonstrates the flow of molten metal through the sand mould 20 during casting. As indicated by the arrows, molten metal enters the swirl chamber 24 via the inlet 28, flows across the upstream surface 34 of the filter 32, around the peripheral surface 26 and then flows through the filter 32 into the outlet 30. Within the swirl chamber 24, rotation of the metal is generally about an axis B, which is orthogonal to the mutually parallel planar sidewalls and parallel to plane of the filter 32. The rotation of the metal encourages impurities in the metal to collect in the swirl chamber 24 rather than being carried along with the metal flow through the filter. The metal having fewer impurities therein will not block the filter up as quickly and will improve the flow of metal downstream to the casting portion (not shown). Of course the residence time of any particular aliquot of metal will vary. Some metal may pass immediately through the filter and some metal may circulate multiple times in the swirl chamber.

FIG. 3 is a perspective view of a pattern 40 that is used to prepare the swirl chamber 24, the inlet 28 and the outlet 30 shown in FIG. 2. In this embodiment, the pattern 40 does not comprise a filter. The filter can be placed in the mould shortly prior to casting. The pattern is basically a cylindrical disc 42 having a first leg 44 extending generally vertically and tangentially from the peripheral surface of the disc 42 and adjacent thereto a second leg 46 extending generally horizontally and tangentially from the peripheral surface of the disc 42. A generally cuboidal portion 48 lies between the peripheral surface of the disc 42 and the second leg 46 and defines the region for placement of the filter in use (the filter housing).

The pattern 40 is divided into two components (40a, 40b) along a horizontal plane A that bisects the disc 42 below its centre and that is coincident with the upper surface of the second leg 46. The upper component 40a can be used in the formation of the cope part of the mould and the lower component 40b can be used in the formation of the drag part of the mould. The cope and drag parts can then be brought together to form the mould 20 and define the cavity shown in FIG. 2.

Figure 4A:
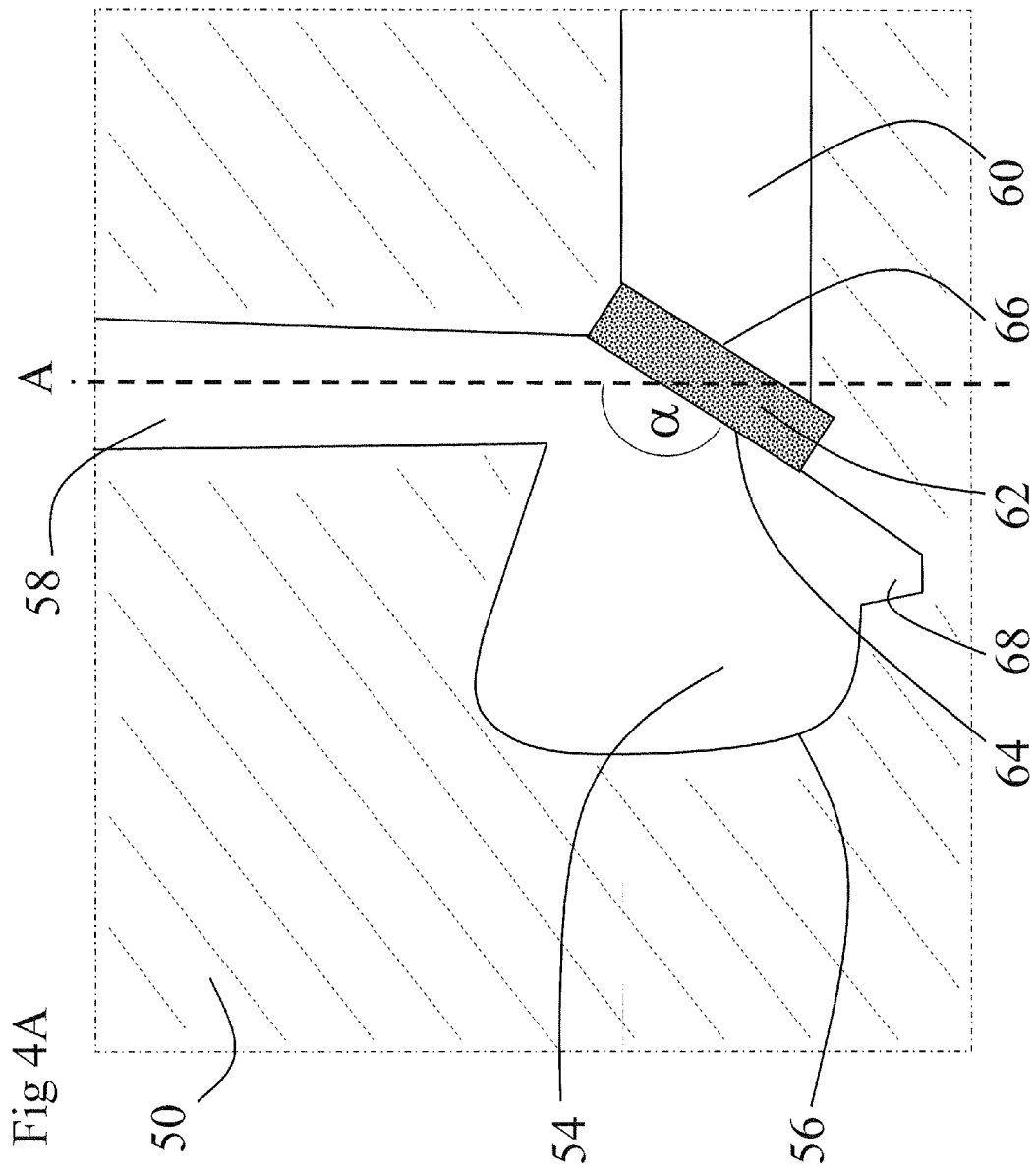
FIG. 4A is a cross-section of part of the running system of a mould in accordance with another embodiment of the invention.

FIG. 4A shows a cross-section of a sand mould 50 comprising part of a running system. The running system comprises a swirl chamber 54 which has a peripheral surface 56 connecting two mutually parallel planar sidewalls (not visible in FIG. 4A). It will be understood that the sidewalls and surfaces of the running system are constituted by the inner surfaces of the mould 50. The swirl chamber 54 has an inlet 58 and an outlet 60, both of which extend from the peripheral surface 56 of the swirl chamber 54. The inlet 58 extends away from the swirl chamber 54 to the rest of the upstream part of the running system. The outlet 60 extends away from the swirl chamber 54 to the rest of the downstream part of the running system. The mould 50 is shown in the appropriate orientation for casting and as can be seen, the inlet 58 is substantially vertical and the outlet 60 substantially horizontal.

A filter 62 is located in the peripheral surface of the swirl chamber 54, at the interface of the swirl chamber 54 and the outlet 60. The filter 62 has an upstream surface 64 facing the swirl chamber 54 and a downstream surface 66 facing the outlet 60. The peripheral surface 56 of the swirl chamber 54 opposite the filter 62 is generally planar with radiused upper and lower corners. The peripheral surface 56 of the swirl chamber 54 adjacent the filter 62 extends downward to define a small chamber that defines a sump 68. The sump 68 is below the level of the filter 62 and provides a reservoir for metal leakage. For example, if metal drips into the swirl chamber 54 prior to casting, it collects in the sump 68 rather than solidifying within the main part of the swirl chamber 54, such as on the upstream surface 64 of the filter 62. The inlet 58 has a longitudinal axis A, which passes through the upstream surface 64 of the filter 62. An angle α defined between the longitudinal axis A and the plane of the upstream surface 64 of the filter 62 is 150°.

The swirl chamber 54 has a volume of approximately 252.6 cm$^3$. The upstream surface 64 of the filter 62 has an exposed (working) surface area of approximately 23.04 cm$^2$ (4.8 cm×4.8 cm). Therefore the working surface area of the filter is 9.1% of the volume of the swirl chamber. The thickness of the swirl chamber 54 and the size of the filter 62 and outlet 60 are designed such that the flow and velocity of the incoming metal is not significantly reduced during its residence in the swirl chamber 54.

In this embodiment, the inlet 58 and the planar sidewalls of the swirl chamber 54 are substantially vertical. In an alternative embodiment, the swirl chamber could be oriented so that the inlet 58 and the planar sidewalls would be substantially horizontal.

FIG. 4B demonstrates the flow of molten metal through the sand mould 50 during casting. As indicated by the arrows, molten metal enters the swirl chamber 54 via the inlet 58, flows across the upstream surface 64 of the filter 62, around the peripheral surface 56 assisted by the radiused corners and then flows through the filter 62 into the outlet 60. The flow is generally about axis B, which is orthogonal to the mutually parallel planar sidewalls, and parallel to the plane of the filter 62. The rotation of the metal encourages impurities in the metal to collect in the swirl chamber 54 rather than being carried along with the downstream metal flow. The metal (having fewer impurities therein) will then flow through the filter downstream to the casting portion (not shown). Of course the residence time of any particular aliquot of metal will vary. Some metal may pass immediately through the filter and some metal may circulate multiple times in the swirl chamber.

Figure 5:
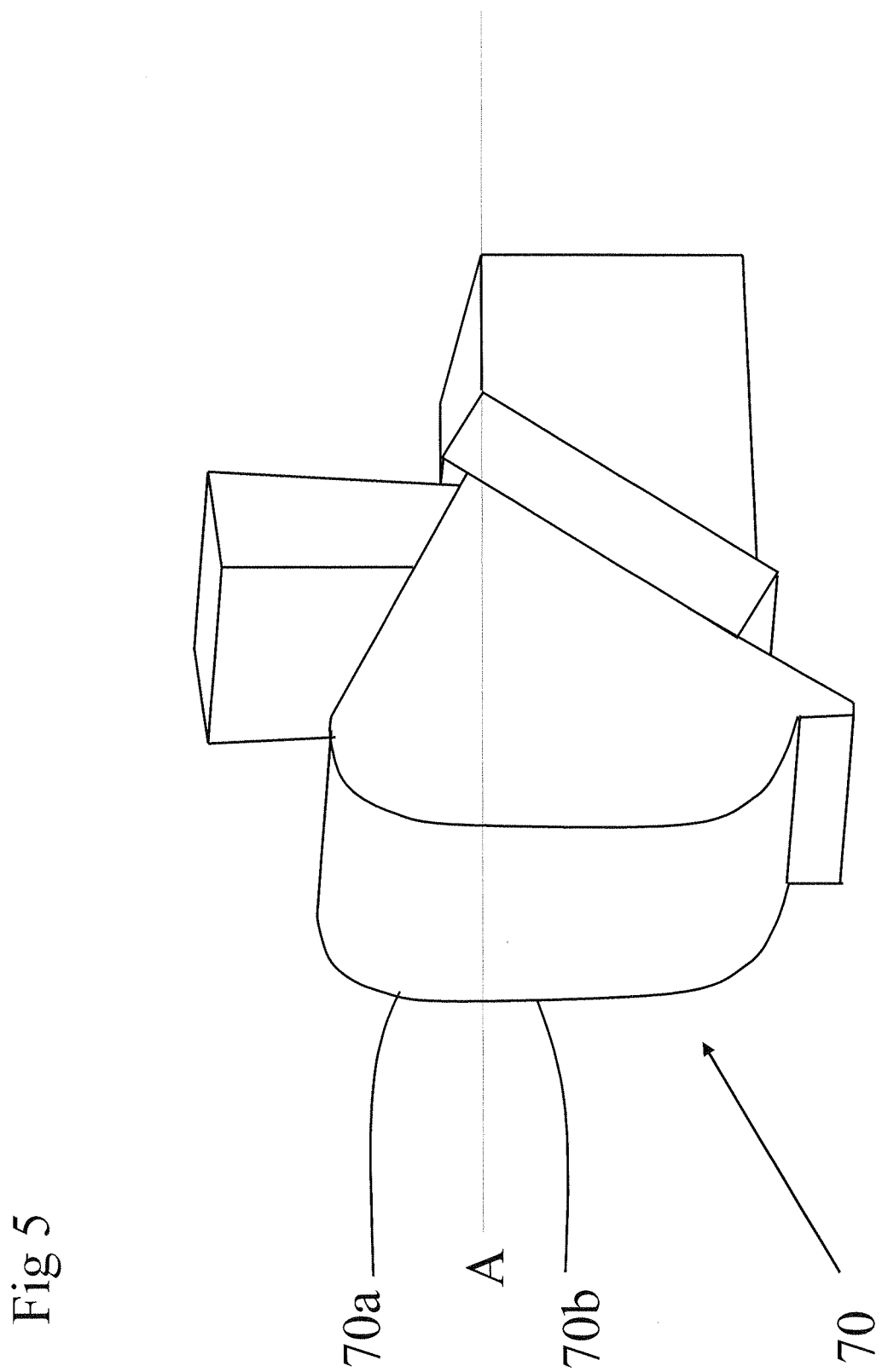
FIG. 5 is a perspective view of a pattern in accordance with an embodiment of the invention, corresponding to the part of the running system of FIG. 4A.

FIG. 5 is a perspective view of a pattern 70 that is used to prepare the swirl chamber 54, the inlet 58 and the outlet 60 shown in FIG. 4A. In this embodiment, the pattern 70 does not comprise a filter. The filter can be placed in the mould shortly prior to casting. The pattern 70 is divided into two components, an upper component 70a and a lower component 70b. The upper component 70a may be used in the formation of the cope part of the mould and the lower component 70b may be used in the formation of the drag part of the mould. The cope and drag parts can then be brought together to form the mould 50 and define the cavity shown in FIG. 4A.

FIG. 6 shows a cross-section of a sand mould 80 comprising part of a running system. The running system comprises two vertically aligned swirl chambers 82a and 82b. Each swirl chamber 82a,b has an individual inlet section 83a and 83b respectively which is connected upstream and perpendicular to a downsprue 84. Each swirl chamber 82a,b has a downstream outlet section 85a and 85b respectively which extends from the swirl chamber in the same plane as the inlets 83a and 83b. The outlets 85a,b then lead downstream to at least one casting cavity (not shown), optionally via ingate areas contiguous with the casting cavity. The running system may be employed to feed one casting cavity, in which case the outlets 85a,b may lead to different parts of the same casting cavity. Alternatively, the outlets 85a,b may lead to two separate casting cavities such that two individual castings may be produced from a single mould and single pouring of metal.

FIG. 7A shows a cross-section of a sand mould 90 comprising part of a running system. The mould 90 is similar to the mould 80 shown in FIG. 6, in that the running system comprises one downsprue 94 leading via individual inlets 93a,b to two swirl chambers 92a and 92b. In contrast to the mould 80 shown in FIG. 6, the swirl chambers 92a,b are aligned in a horizontal position instead of a vertical position. Each swirl chamber 92a,b has a downstream outlet section 95a and 95b respectively which leads to one or more casting cavities (not shown). A filter 96a,b is located in the peripheral surface of each swirl chamber 92a, 92b at the interface between each swirl chamber 92a,b and its respective outlet 95a,b.

FIG. 7B is a plan view of the embodiment shown in FIG. 7A. Molten metal enters the mould 90 via a funnel shaped section 97 of the downsprue 94, flows horizontally along the inlets 93a,b into the swirl chambers 92a,b where the rotational motion causes impurities to collect in the middle part of the swirl chambers 92a, 92b. The molten metal then exits the swirl chambers 92a,b through the filters 96a,b and flows downstream along the outlets 95a,b to the casting cavity.

Figure 8A:
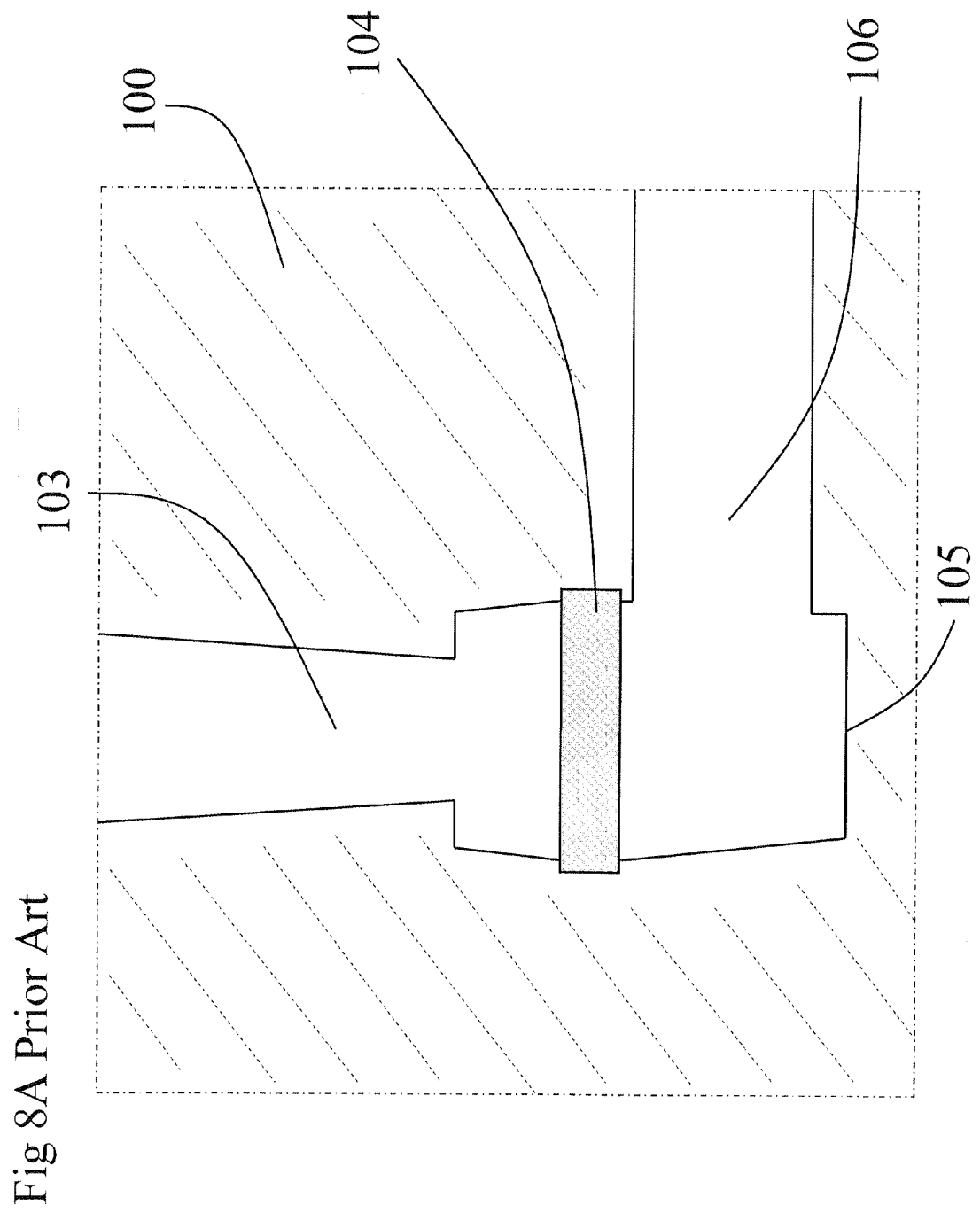

FIG. 8A is a cross-section of part of a sand mould 100 defining part of a conventional running system (also known as a filter print area). The running system comprises a downsprue 103, at the lower end of which a filter 104 is positioned horizontally. Metal flows down the downsprue 103, such that the metal impringes directly onto the surface of the filter 104, passes through the filter 104 and hits a flat bottomed sump 105 before moving horizontally to the outlet area 106 and then to the casting cavity.

Figure 8B:
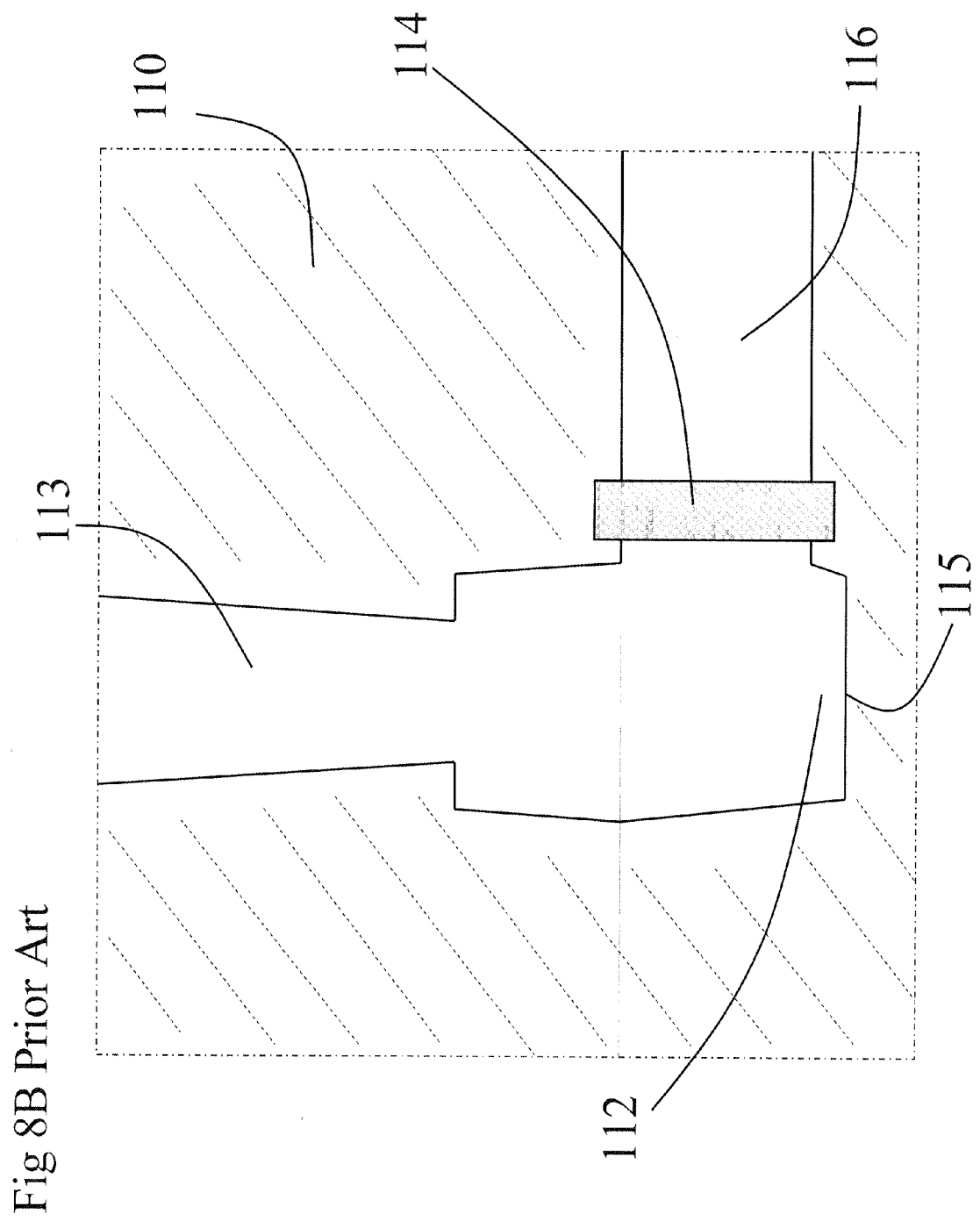

FIG. 8B is a cross-section of part of another sand mould 110 defining part of a conventional running system (also known as filter print area). The running system comprises a downsprue 113, the lower end of which constitutes a sprue base or sump area 112. A filter 114 is positioned vertically within the mould 110, adjacent the sprue base area 112. Metal flows through the downsprue 113, impacts the flat base of the sump 115, flows horizontally through the filter 114 and into an outlet section 116 downstream of the filter and on to the casting cavity.

Figure 9:
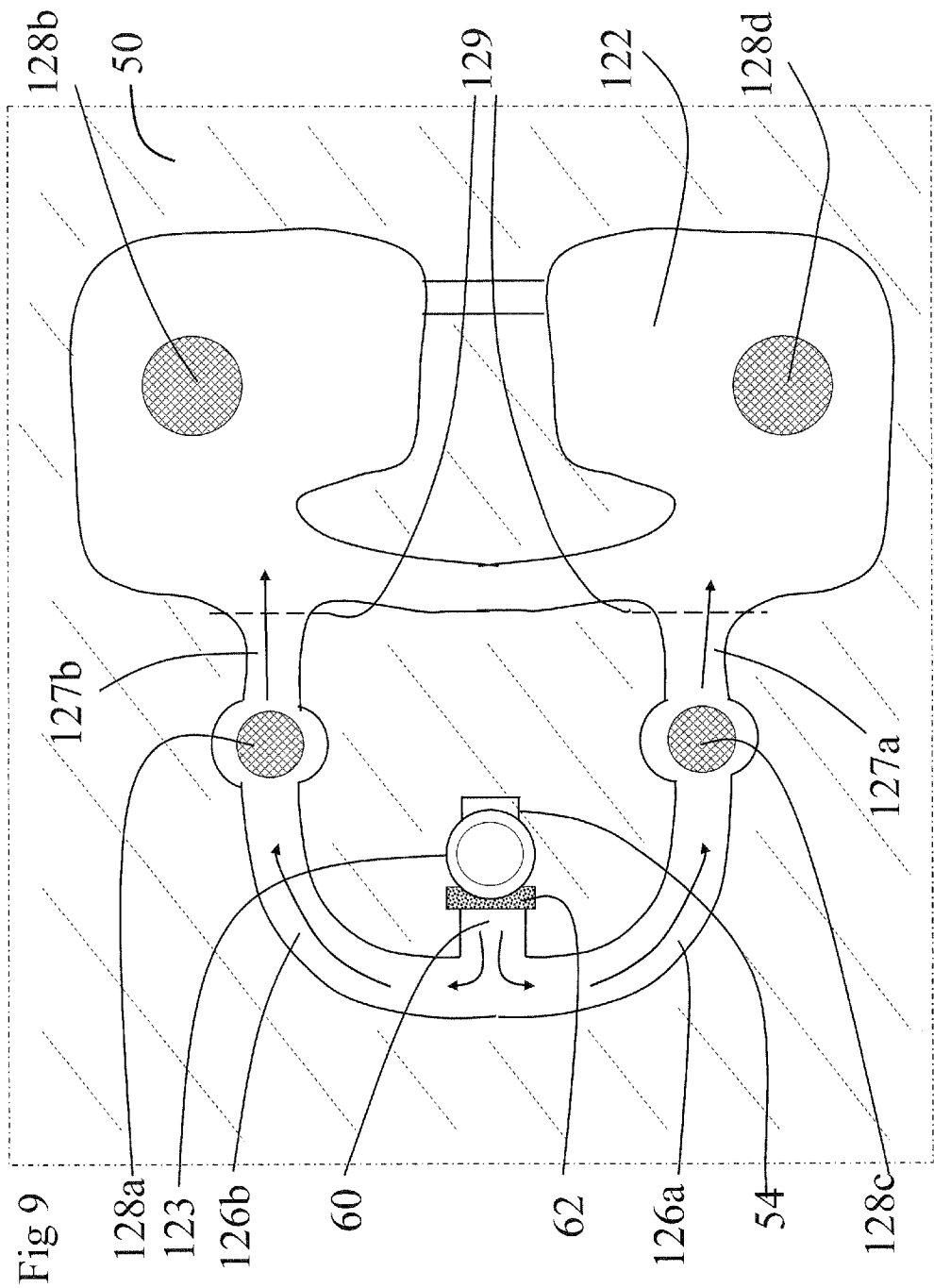
FIG. 9 is a plan view of a mould used to produce a casting in accordance with an embodiment of the invention.

FIG. 9 is a plan view of the entire sand mould 50 comprising a running system, part of which was shown previously in FIG. 4A. Metal enters the mould cavity via a downsprue 123 and then flows into and around the vertically oriented swirl chamber 54 before exiting the swirl chamber 54 through the filter 62 to reach the outlet 60. The outlet 60 then divides into two separate channels 126a,b each of which lead to different parts of a casting cavity 122 via ingate sections 127a and 127b. As in the embodiment shown in FIG. 1, feeder sleeves 128a, 128b, 128c and 128d, are situated on top of the casting cavity 122 and ingate areas 127a,b to maintain a reservoir of molten metal during mould filling solidification of the casting assembly. After cooling, the running system is removed from the casting by cutting across the sections 129.

Figure 10:
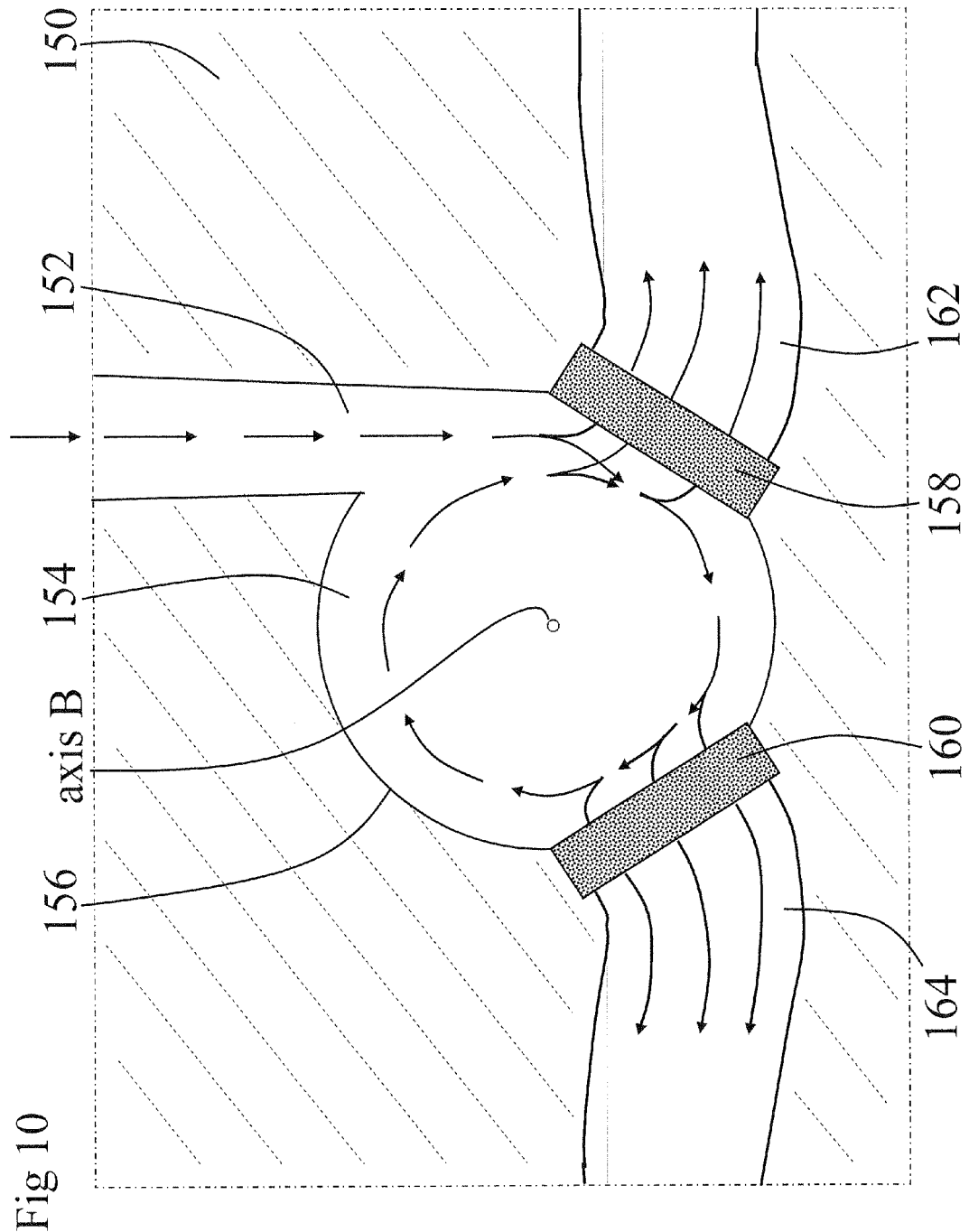
FIG. 10 is a cross-section of part of a running system of a mould in accordance with another embodiment of the invention.

FIG. 10 is a cross-section of a sand mould 150 comprising part of a running system. The running system comprises a vertically oriented inlet portion 152 which leads to a swirl chamber 154. The peripheral surface 156 of the swirl chamber 154 has a circular cross-section and two filters 158, 160 are located in the peripheral surface 156. A first filter 158 leads to a first outlet portion 162 and a second filter 160 leads to a second outlet portion 164. A longitudinal axis of the inlet portion 152 passes through the first filter 158 only. The outlets 162, 164 are slightly curved to smooth the flow of metal exiting the filters.

The metal flow is demonstrated by the arrows. It can be seen that the first and second filters 158, 160 are arranged parallel to the axis B about which the metal rotates in use. The metal enters the swirl chamber 154 via the inlet portion 152, rotates about the swirl chamber 154 and exits via both outlet portions 162, 164. The swirl chamber 154 with two outlet portions 162, 164 is advantageous because metal can flow through the swirl chamber more quickly, offering a greater surface area of filtration for a similar volume of swirl chamber with a single filter.

Figure 11:
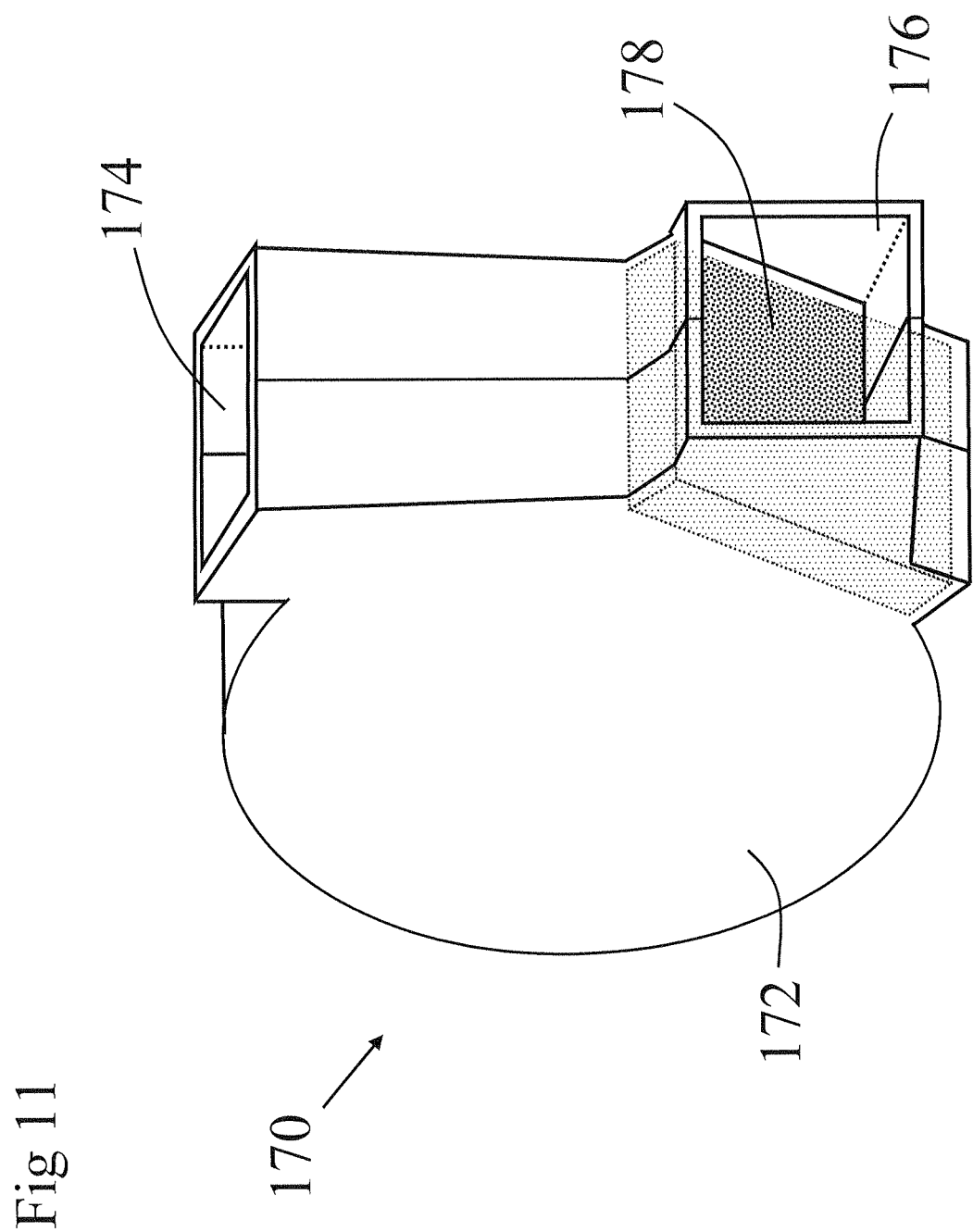
FIG. 11 is a perspective view of a swirl chamber for use in a mould in accordance with an embodiment of the invention.

FIG. 11 is a perspective view of a ceramic (refractory) housing 170 for use in a mould in accordance with the invention. The housing 170 consists of a swirl chamber 172, an inlet portion 174 and outlet portion 176. A refractory foam filter 178 is located in the peripheral surface of the swirl chamber 172, at the interface between the swirl chamber 172 and the outlet portion 176. The housing 170 is adapted to secure the filter 178 in place; the housing has a specially shaped recess which ensures that the filter is correctly positioned in the peripheral surface of the swirl chamber 172. The housing would be located within the mould such that molten metal would enter the inlet portion 174, swirl around the swirl chamber 172 and flow through the filter 178 to the outlet portion 176 and then down stream to the casting cavity. The housing 170 could be placed in the mould vertically or horizontally.

EXAMPLE 1 AND COMPARATIVE EXAMPLES
1A AND 1B

Attempts were made to prepare a steel casting (spring basket) having a total poured weight of 68 kg using a standard mould comprising a filter (Comp. Ex. 1A and 1B) and a mould in accordance with an embodiment of the invention (Ex. 1). A carbon bonded foam filter as sold by Foseco under the trade name STELEX PrO having dimensions 50 mm×50 mm×20 mm and porosity of 10 ppi was used in each case. Ex. 1 used the mould 50 shown in FIGS. 4A, 4B and 9. Comp. Ex. 1A used a mould in which the filter was arranged horizontally so that metal flowed directly from a downsprue onto the surface of the filter as detailed in FIG. 8A. Comp. Ex 1B used a mould in which the filter was arranged vertically so that metal flowed through a downsprue and then horizontally through the filter, as shown in FIG. 8B.

COMPARATIVE EXAMPLE 1A

Comp. Ex. 1A was unsuccessful. At a pouring temperature of 1600° C., the filter blocked during mould filling such that it was not possible to completely fill the casting cavity with metal. The pouring temperature was increased to 1640° C. but the filter still blocked before the mould could be filled. Some improvement in metallurgical properties (reduction of oxide inclusions in the casting) was found if the filter was replaced with a thinner version (50 mm×50 mm×15 mm), however the filter still blocked before the mould was filled for a high proportion of the moulds that were poured.

COMPARATIVE EXAMPLE 1B

Comp. Ex. 1B did not produce a successful casting. Pouring times were increased and filter blockages again occurred for a number of the moulds that were poured. This was observed for pouring temperatures of both 1600° C. and 1640° C.

EX. 1

A successful casting was made using the mould shown in FIGS. 4A, B and 9 at a pouring temperature of 1620° C. The filter did not block and the resulting casting was clean and defect free. A similar result was observed at a pouring temperature of 1600° C.

EXAMPLE 2

A larger and heavier casting than in Ex. 1 was made using a mould having a running system corresponding to that shown in FIG. 4A. Molten steel at a pouring temperature of 1620° C. was poured into the mould 50, through the running system to the casting portion (not shown in FIG. 4A). The STELEX PrO carbon bonded foam filter 62 did not block on pouring and furthermore, the entire casting portion was filled without blockage or flow rate reduction compared to an unfiltered casting, yielding a casting of 236 kg. As stated above, the surface area of the filer 62 is 23.04 cm². Accordingly, the filter capacity is at least 10.24 kgcm$^{-2}$. Inspection demonstrated that there had been no filter breakage or metal by-pass.

The test was then repeated using a second grade of carbon bonded filter that had a lower carbon content than in the previous test. These filters with a higher content of refractory material are significantly heavier than the STELEX PrO carbon bonded filters of the same size and require higher priming times. Castings were successfully produced at a pouring temperature of 1620° C. with no filter blockages observed. Reducing the pouring temperature to 1600° C. (the temperature used to pour unfiltered castings) causes some instances of filter blockages.

EXAMPLE 3

A casting as described in example 2 was made using the running system shown in FIG. 2. Molten steel was poured into the mould 20, through the running system to the casting portion (not shown in FIG. 2). The carbon bonded filter 32 did not block on pouring and the entire casting portion was filled without blockage of the filter.

Figure 12:
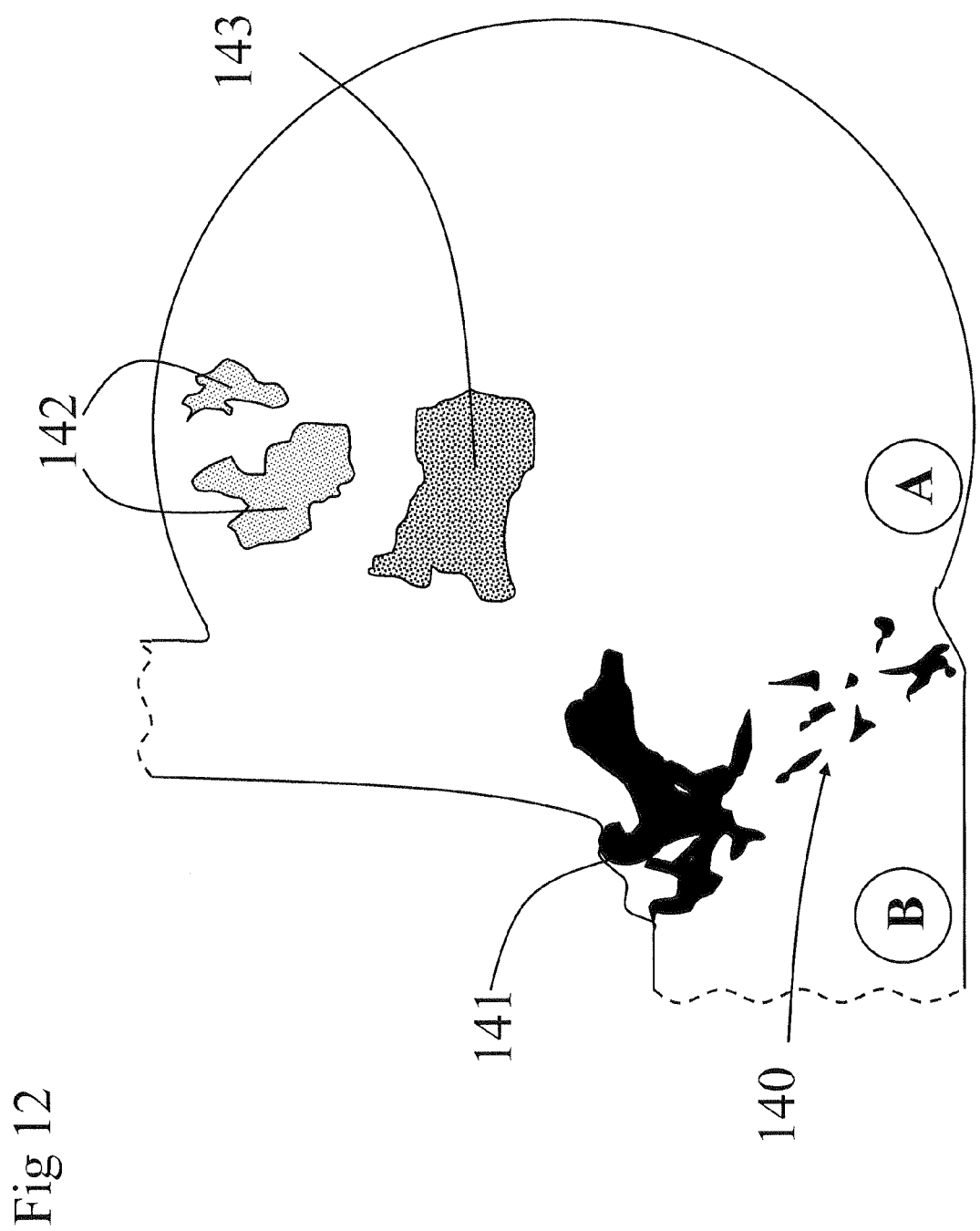
FIG. 12 is a schematic diagram of part of a casting formed using a mould in accordance with an embodiment of the invention.

After cooling and removal from the mould, the portion of the running system which comprised the swirl chamber 24, the filter 32, the inlet 28 and the outlet 30 was cut off from the casting. The metal piece was then sectioned in half and the internal structure of the metal within the running system was examined. FIG. 12 is a schematic diagram of a cast running system resulting from the mould 20. Inclusions and residues 141 from the filter 32 are partially visible within the metal. It can also be seen that some inclusions 142 have collected in the upper part of the swirl chamber rather than in the filter area 140 or in the casting itself. In particular, it is noted that the inclusions have collected in a region distant from the filter 32 thereby increasing the capacity of the filter 32. Some porosity 143 is also seen in the centre of the metal section.

The metal piece was examined under a microscope to assess its micro cleanliness. Two areas were chosen, area A being metal in the lower portion of the swirl chamber upstream of the filter, and area B metal that had passed through the filter. Samples were cut from the metal piece, mounted and the surface polished to a 1 micron finish. Seven random areas were photographed for each sample using digital image analysis at 100× magnification. It was found that metal in area A contained an average 0.43% type I oxide and sulphide inclusions (unevenly distributed), whereas area B had more evenly distributed inclusions, with an average content of 0.26%.

The capacity of filters for metal filtration depends on a wide range of factors such as filter composition, porosity and pore size, metal type and quality (cleanliness), pouring temperatures and method, casting weight and filter application (running system design) etc. Based on practical examples in foundry applications, capacities for a typical silicon carbide based ceramic filter for iron castings may range from 1 to 4 kg/cm² (1-2 kg/cm² for ductile iron, up to 4 kg/cm² for flake graphite and malleable irons). For both zirconia based ceramic and carbon bonded filters, capacity for steel filtration is typically in the range 1.5 to 3 kg/cm², and of the order 4 kg/cm² when used for ductile iron. Using the invention, it has been observed that filter capacities of 5 kg/cm² are readily achieved, as illustrated by the above Examples 2 and 3, each of which had a capacity of the order 10 kg/cm², a significant increase compared to filters used in conventional running systems.

Whilst not being bound by theory, the inventors propose that the mould of the present invention improves filtration because the molten metal flows across the surface of the filter. This is thought to have advantages in at least two ways. In casting processes using filtration, it is important to avoid metal freezing in the cold filter at the start of casting. Some freezing may be inevitable and merely reduces the efficiency of the filter. Serious freezing may block the filter completely and prevent casting. The process of heating the filter to operating temperature (by contact with the molten metal) is known as priming. Significant freezing is usually avoided by overheating the metal being cast (at an energy cost). Thus some thermal energy can be lost to the filter (and running system) whilst maintaining the metal above its melting point. In the present invention, the metal impacts the filter at an angle so that much of it passes across rather than through the filter. Some heat is transferred to the filter and as that metal moves away from the filter it is continuously being replaced by new hot metal so that the priming process is completed with minimum freezing. The inventors have found that the temperature of the melt to be cast can be reduced resulting in appreciable savings in energy costs.

Secondly, it is believed that the flow of molten metal across the filter "washes" the surface of the filter, thereby hindering the build up of inclusions, such as an oxide skin and sand eroded from the mould (by the passage of molten metal), and that a proportion of the inclusions are then kept away from the filter and concentrated in the centre and upper portions of the swirl chamber. The present invention provides for higher filtration capacity and efficiency.

In addition to the observations made in the casting trials, the above is further supported by the use of MAGMASOFT simulation software to predict the flow and solidification of metal in various embodiments of the invention. MAGMASOFT is a leading simulation tool supplied by MAGMA Gießereitechnologie GmbH that models the mould filling and solidification of castings. It is typically used by foundries to predict the mechanical properties of castings to enable optimisation of the casting method (design of the running system and feeders) so as to avoid expensive and time consuming foundry trials. Using the full version of MAGMASOFT (Solver 5, coarse mesh and pressure drop to simulate the filter), the inventors have conducted simulations to predict the flow (direction and velocity) and solidification (temperature profiles vs time) of metal in the running systems shown in FIGS. 2, 4, 6 and 7. The simulations clearly show a strong flow of metal that flows rapidly across the face of the filter and circulates in the swirl chamber. Simulating trace particles in the metal shows that if they are caught in the vortex of the swirling metal, they are likely to remain there for some time. The software is not capable of modelling filtration effects such as blocking or trapping of inclusions or the washing of inclusions from the filter, however the strong flow of metal across the filter surface and swirling effect, together with the observations in the casting trials detailed in Examples 1 to 3 leads to the inference that such a flow could remove blocking particles on the front face of the filter.

In all of the examples given so far, the mould has been horizontally parted, however it is understood that the invention is equally applicable to vertically parted moulding systems. In particular, small to medium size castings may be produced in automatic flaskless moulding machines such as the Disamatic machine supplied by Georg Fischer Disa which utilises a greensand moulding system.

The invention claimed is:

1. A refractory housing for use in a mould for casting metal, said housing comprising:
   an inlet portion;
   an outlet portion;
   a swirl chamber disposed between the inlet and outlet portions;
   a filter provided at an interface between the swirl chamber and the outlet portion;
   wherein the filter is arranged parallel to an axis about which metal rotates in use within the swirl chamber and a longitudinal axis of the inlet portion passes through the filter;
   wherein the inlet and the outlet portions lie in the same plane and perpendicular to the axis about which metal rotates in use within the swirl chamber.

\* \* \* \* \*